United States Patent [19]
Luh

[11] Patent Number: 5,885,178
[45] Date of Patent: Mar. 23, 1999

[54] ELECTRO-HYDRAULIC CONTROL MEANS FOR CONTROLLING A HYDRAULIC PRESSURE IN A CONTINUOUSLY VARIABLE LOOP TRANSMISSION AND THE LOOP TRANSMISSION CONTAINING SAME

[75] Inventor: Joachim Luh, Biegigheim-Bissingen, Germany

[73] Assignee: Robert Bosch GmbH, Stuttgart, Germany

[21] Appl. No.: 793,146

[22] PCT Filed: Mar. 5, 1996

[86] PCT No.: PCT/DE96/00952

§ 371 Date: Feb. 6, 1997

§ 102(e) Date: Feb. 6, 1997

[87] PCT Pub. No.: WO97/01050

PCT Pub. Date: Jan. 9, 1997

[30] Foreign Application Priority Data

Jun. 22, 1995 [DE] Germany ............... 19522674.7

[51] Int. Cl.[6] .............. F16H 59/00; B60K 41/12; F04B 49/00
[52] U.S. Cl. ............... 474/28; 477/50; 417/15
[58] Field of Search ............... 474/8, 17, 18, 474/28, 71, 72, 69, 70; 417/375, 379, 15; 477/34, 37–38, 50; 74/473.1, 473.11, 473.12, 473 R

[56] References Cited

U.S. PATENT DOCUMENTS

| | | | |
|---|---|---|---|
| 4,764,155 | 8/1988 | Kumura et al. | 474/17 |
| 4,869,706 | 9/1989 | Miyata et al. | 474/8 |
| 4,875,892 | 10/1989 | Sueda | 474/17 |
| 5,045,028 | 9/1991 | Rattunde et al. | 474/17 |
| 5,049,112 | 9/1991 | Gunsing | 474/8 |
| 5,098,345 | 3/1992 | Van Vuuren | 474/8 |
| 5,173,084 | 12/1992 | Lemieux | 474/8 |
| 5,378,198 | 1/1995 | Moroto et al. | 474/8 |
| 5,431,602 | 7/1995 | Hendricks et al. | 474/28 |

FOREIGN PATENT DOCUMENTS

0451887A1  3/1991  European Pat. Off. .

*Primary Examiner*—Charles A. Marmor
*Assistant Examiner*—Matthew A. Kaness
*Attorney, Agent, or Firm*—Michael J. Striker

[57] ABSTRACT

The electro-hydraulic control device is designed to control a continuously variable loop transmission including a hydraulic bevel disk displacement device having two pairs of bevel disks, each pair of which has piston/cylinder elements with a piston chamber, and a pump for supplying one of the piston chambers with hydraulic oil. The electro-hydraulic control device supplies and regulates a hydraulic pressure in the piston chamber by means of a flow control valve (50) and a proportioning pressure relief valve (30). The electro-hydraulic control device also includes a pressure sensor (90) for generating an electronic pressure sensor signal according to the hydraulic pressure in a low-pressure control pressure line (34) connecting the flow control valve (50) and the proportioning pressure relief valve (30) and an electronic control unit for generating an electrical current for actuating the flow control valve (50) according to the pressure sensor signal. The electronic control unit includes a multiplier (95) connected between the flow control valve (50) and the pressure sensor (90) for generating the electrical current from the comparatively reduced pressure sensor signal from the sensor connected with the control pressure line.

8 Claims, 2 Drawing Sheets

ELECTRO-HYDRAULIC CONTROL MEANS FOR CONTROLLING A HYDRAULIC PRESSURE IN A CONTINUOUSLY VARIABLE LOOP TRANSMISSION AND THE LOOP TRANSMISSION CONTAINING SAME

BACKGROUND OF THE INVENTION

1. Field of the Invention

The present invention relates to an electro-hydraulic control means for controlling a continuously variable loop transmission and, more particularly, to an electro-hydraulic control means for controlling a hydraulic pressure in a continuously variable loop transmission including a hydraulic bevel disk axial displacement device provided with a secondary piston chamber and a pump for supplying the secondary piston chamber with hydraulic oil in order to provide a clamping force in the displacement device, wherein the control means includes several individual valves for adjusting the hydraulic pressure including a proportioning pressure relief valve and a flow control valve. The invention also relates to a loop transmission including the aforementioned control means.

2. Prior Art

A hydraulic control for an electronically controlled continuously variable transmission (continuously variable transmission: CVT) is described in EP 0 451 887 A1. The CVT transmission, which is preferably used in automobiles has, among other things, an electronic control which regulates the hydraulic oil pressure in the secondary side of the piston chamber in order to set the clamping force during normal driving operations in such a way that advantageous transmission effectiveness is achieved. For regulating the secondary oil pressure, the control requires the vicinity actual pressure value in the area of the secondary side piston chamber. A pressure sensor is disposed there for this purpose. The nominal pressure is adjusted as a function of the measured actual pressure via a directly controlled valve.

SUMMARY OF THE INVENTION

Among other things, the hydraulic transmission in accordance with the invention comprises a proportional pressure relief valve for regulating the secondary oil pressure, which is controlled by an electrically operated flow control valve. The electrical supply of the actuating device of the flow control valve is performed by a control unit which detects the control oil pressure of the control line leading to the proportional pressure relief valve by means of a pressure sensor. Among other things, the control unit contains, besides a sensor signal evaluating device and an electronic pressure control device, a multiplier device that multiplies by a ratio between the pressure working surfaces on the control oil pressure side and on the secondary oil pressure side of the proportional pressure relief valve slide. Since the hydraulic oil pressures acting on the proportional pressure relief valve slide are inversely proportional to the two pressure working surface areas, it is possible to calculate the secondary oil pressure from the respective control oil pressure. The flow control valve is supplied with current as a function of the calculated secondary oil pressure obtained from the pressure sensor signal using the multiplier.

Based on the invention, it is no longer necessary to connect the pressure sensor with or in a working line under high secondary oil pressure, or the piston chamber on the secondary side. Instead, only one pressure sensor is required, which is designed for the lower control oil pressure. It is therefore possible to employ a simpler and more cost-effective sensor, which can operate without its own oil feed.

Furthermore, the sensor detecting the control oil pressure can also be installed away from the respective control line, for example directly in the control unit.

In addition, the characteristics of the control path for the pressure regulator housed in the control unit becomes more advantageous, since at least two dynamic elements can be omitted. For example, these are, for one, the valve slide dynamics of a directly controlled pressure relief valve and, for another, the elasticity of the secondary side piston chamber including the associated working line sections.

BRIEF DESCRIPTION OF THE DRAWING

An exemplary embodiment, in addition to the prior art, is schematically represented in the drawings in the form of hydraulic circuit diagrams and will be explained in more detail in the following description of the drawings, in which.

DESCRIPTION OF THE PREFERRED EMBODIMENTS

Figure 1:
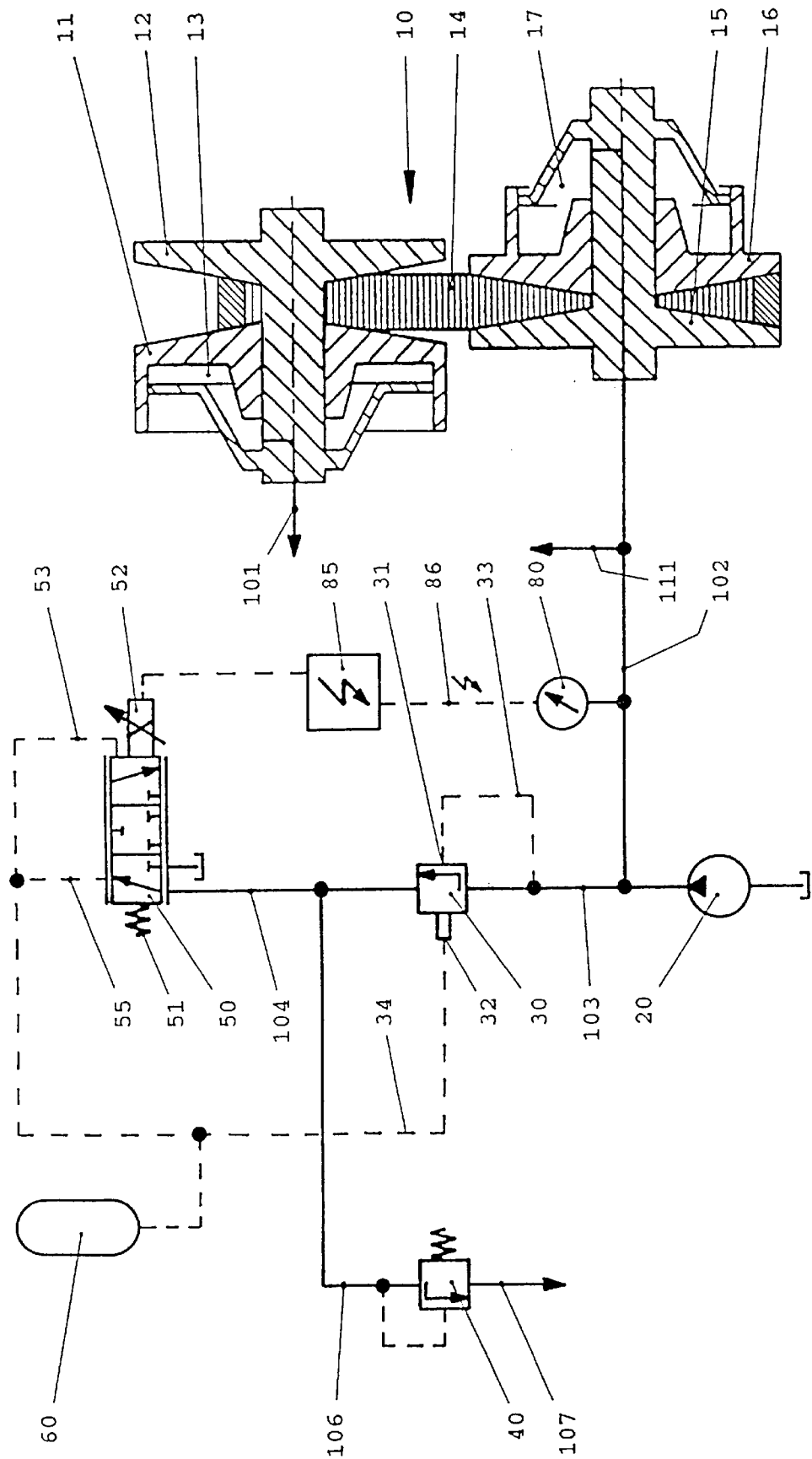
FIG. 1 is a hydraulic circuit diagram of a control means for a loop transmission not according to the invention with a pressure sensor in the secondary line.

FIG. 1 shows a portion of a hydraulic circuit diagram for controlling the hydraulic oil pressure of the pressure cylinder on the power take-off side of a continuously variable loop transmission. The known loop transmission (10) comprises two pairs of beveled disks, between which a transfer means (14), for example a push link conveyor, a chain, a V-belt or the like, is disposed. Both pairs of bevel disks respectively consist of two bevel disks (11, 12; 15, 16), which are embodied to be hydraulically clampable to each other. The piston and cylinder elements required for this are preferably integrated into at least one element of the bevel disks. The piston chambers which these elements enclose are the piston chamber (13) on the primary side, and the piston chamber (17) on the secondary side. They are each charged with working pressure in accordance with the gearing.

A partially known hydraulic circuit, represented in FIG. 1, is used for providing the necessary clamping force at the pair of disks (15, 16) on the secondary side. On the one hand, a pump (20) directly supplies the piston chamber (17) on the secondary side via a working line (103) and a secondary line (102) branching off it. On the other hand it conveys hydraulic oil into a continuing working line (107) through the line (103) and the two pressure control valves (30) and (40), as well as the working lines (104) and (106) which connect them. Downstream-connected further hydraulic components can be connected to the latter.

The pressure control valve (30) is a proportioning pressure relief valve with two control connectors (31) and (32). It has a valve slide or the like with two surfaces of different size for the charging with control pressure. In this case the effective surface in the area of the control connector (32) is larger than the effective surface in the area of the control connector (31).

The input pressure of the proportioning pressure relief valve (30) is proportionally limited in respect to a control oil pressure present at the control connector (32). A continuously operating flow control valve (50) supplies the control oil pressure. This valve is a proportional 3/3-way valve, for example, whose valve slide is clamped between a restoring spring (51) and an electrical actuator (52).

The displacement of the valve slide of the flow control valve (50) is predetermined by an electronic control (85). To this end, the control (85) receives signals representing a measurement of the secondary oil pressure via an electrical signal line (86) from a pressure sensor (80) connected to the secondary line (102). With the aid of the pressure sensor signals received, the control generates an appropriate current supply for the electrical activator (52).

In the currentless state, the flow control valve (50) connects the working line (104) with the control line (55) without throttling. The latter is divided into the control line (34), leading to the proportioning pressure relief valve (30), and a control line (53). The control line (53) is connected to the flow control valve (50) next to electrical actuator (52), so that its control oil pressure counteracts the restoring spring (51).

If necessary, a hydraulic reservoir (60) is connected to the control line (34). It can possibly be embodied as a spring reservoir.

Figure 2:
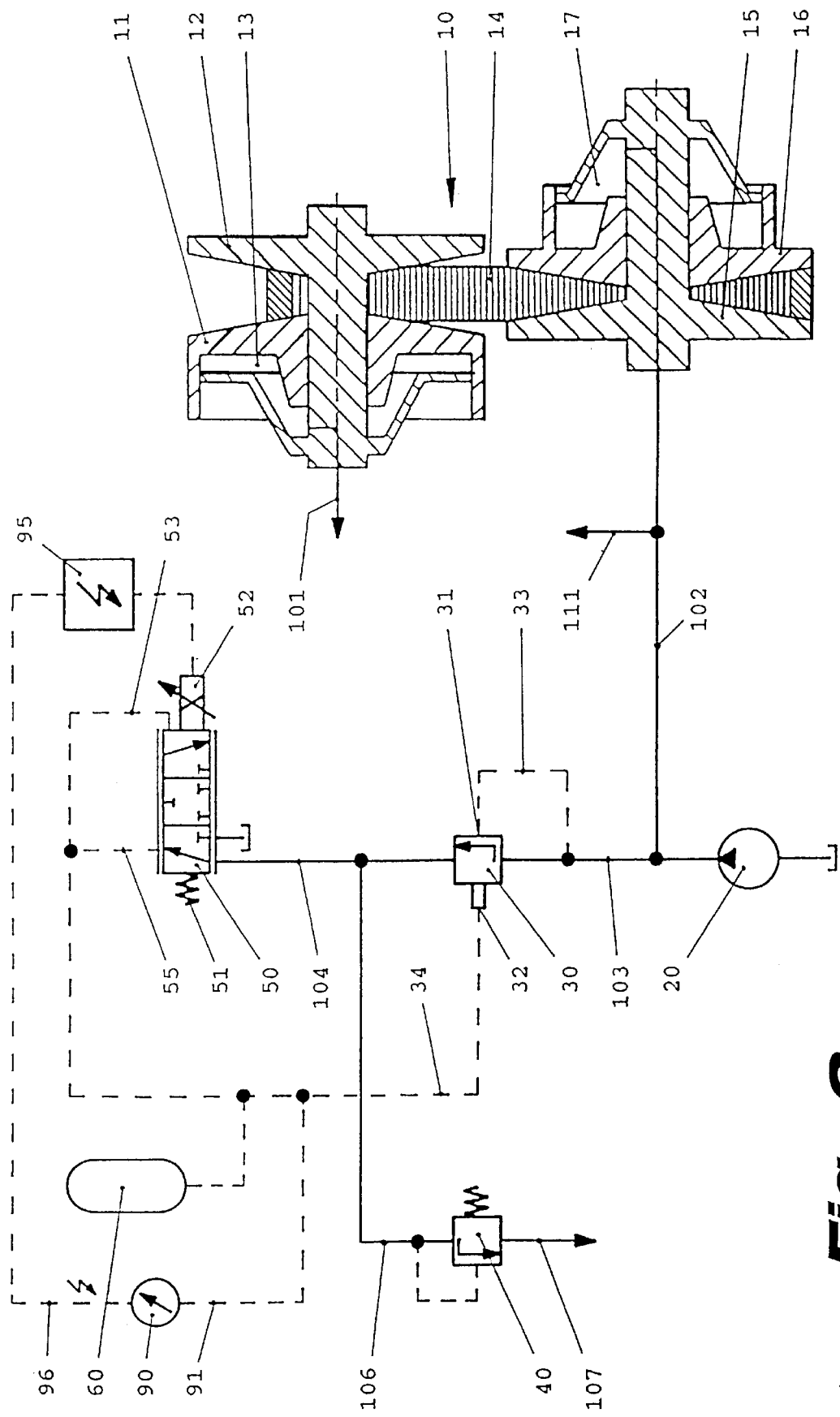
FIG. 2 is a hydraulic circuit diagram of a control means according to the invention for a loop transmission with a pressure sensor in a control line charged with control oil pressure.

A customary hydraulic circuit, not represented in FIGS. 1 and 2, is used for generating the required clamping force at the pair of disks (11, 12) on the primary side. Among other things, it is connected between the working line section (111) and the primary line (101).

In the course of the operation of the transmission, the slide valve of the proportioning pressure relief valve (30) is at an equilibrium. On the one side the pump pressure acts in the opening direction on the smaller valve slide surface via the control line (33). On the other side the control oil pressure is present in the closing direction on the larger valve slide surface via the control line (34). In this case the upper limit of the control oil pressure is predetermined by the pressure control valves (40). The pre-control pressures below the maximum limit are determined by the flow control valve (50). In case of low secondary oil pressure, which is measured by the pressure sensor (80), the electrical actuator (52) is currentless or minimally supplied with current. In this phase the hydraulic oil pressure in the working line (104) corresponds to the control oil pressure. The hydraulic reservoir (60) is charged during the opening of the flow control valve (50).

In case of higher pressure in the working lines (102 to 104), the flow control valve (50) is throttled on the one hand by means of the control oil pressure via the control lines (55) and (53), and on the other hand by the increased current supplied to the electrical actuator (52).

A hydraulic control in which the control oil pressure is measured instead of the secondary oil pressure is represented in FIG. 2. To this end a pressure sensor (90) is connected via a feeler line (91) to the control line (34). Since the proportioning pressure relief valve (30) always regulates the secondary oil pressure proportionally in respect to the control oil pressure, it is possible by multiplication with a defined factor to calculate the secondary oil pressure. Here, the factor corresponds to the ratio of the two pressure working surfaces on the valve slide of the proportioning pressure relief valve (30), wherein the ratio is the quotient of the large surface at the control connector (32) and the small surface at the control connector (31).

The signal provided by the pressure sensor (90) is conducted to a control unit (95) via an electrical signal line (96) in order to be processed there and, multiplied with the appropriate factor, to be used for the current supply for the electrical actuator (52).

In this way it is possible to employ a pressure sensor (90) which only needs to be designed for a low control oil pressure instead of a high secondary oil pressure. The control unit (90) only needs to be slightly modified or adjusted in respect to the control unit (80) in FIG. 1, since control units of this type as a rule have adjustable multiplicative output signal amplifiers.

Independently of this it is also possible to replace the electrical valve actuation by a hydraulic pre-control valve or other similarly acting means.

I claim:

1. An electro-hydraulic control means for controlling a continuously variable loop transmission, said continuously variable loop transmission comprising a hydraulic bevel disk axial displacement device provided with a piston chamber and pump means for supplying the piston chamber with hydraulic oil in order to provide a clamping force in said displacement device, wherein said electro-hydraulic control means comprises means for supplying and regulating a hydraulic pressure of the hydraulic oil in the piston chamber, said means for supplying and regulating comprising a plurality of individual valves (30,50) including a proportioning pressure relief valve (30) and a flow control valve (50), wherein said flow control valve (50) includes an electrical actuator (52) and means for triggering said proportioning pressure relief valve, and the proportioning pressure relief valve (30) and the flow control valve (50) are connected with each other by a control pressure line (34);

a pressure sensor (90) connected in the control pressure line (34) including means for generating an electronic pressure sensor signal according to the hydraulic pressure in the control pressure line (34); and an electronic control unit for generating an electrical current for actuating said electrical actuator (52) and said means for triggering of said flow control valve (50) according to the pressure sensor signal, wherein said electronic control unit includes multiplier means (95) for generating said electrical current from said pressure sensor signal and said multiplier means is connected between said electrical actuator (52) and said pressure sensor (90).

2. The electro-hydraulic control means as defined in claim 1, wherein said proportioning pressure relief valve (30) has a slide valve with a pressure working surface on a control oil pressure side and another pressure working surface on a secondary oil pressure side and the multiplier means (95) comprises a multiplier for calculating a set value of said hydraulic pressure in said piston chamber, said multiplier is equal to a quotient of a dividend and a divisor, said dividend is equal to an area of said pressure working surface on the control oil pressure side and said divisor is equal to an area of said pressure working surface on the secondary oil pressure side.

3. The hydraulic control as defined in claim 1, further comprising a hydraulic reservoir (60) connected in parallel with the pressure sensor (90) to the control pressure line (34).

4. The hydraulic control as defined in claim 1, further comprising a pressure control valve (40) connected to the proportioning pressure relief valve (30) downstream of the proportioning pressure relief valve (30).

5. A continuously variable loop transmission comprising two pairs of bevel disks (11, 12; 15,16);

transfer means (14) connecting said two pairs of bevel disks and hydraulically clampable between individual bevel disks of each of said two pairs;

means for clamping said individual bevel disks of each of said pairs together, said means for clamping comprising a piston element and a cylinder element in at least one of said individual bevel disks of each of said pairs, each of said piston elements and said cylinder elements forming a piston chamber for hydraulic oil, and pump means for supplying at least one of the piston chambers with the hydraulic oil in order to clamp said bevel disks of at least one of said pairs together; and electro-hydraulic control means for controlling a hydraulic pressure of the hydraulic oil in said at least one of said piston chambers, wherein said electro-hydraulic control means includes a plurality of individual valves (30,50) including a proportioning pressure relief valve (30) and at least one flow control valve (50) of said individual valves (30,50), wherein said at least one flow control valve (50) includes an electrical actuator (52) and means for triggering said proportioning pressure relief valve (30), and the proportioning pressure relief valve (30) and the at least one flow control valve (50) are connected with each other by a control pressure line (34);

a pressure sensor (90) connected in the control pressure line (34) and including means for generating a pressure sensor signal according to the hydraulic pressure in the control pressure line (34); and an electronic control unit for generating an electrical current for actuating said electrical actuator (52) and said means for triggering of said at least one flow control valve (50) in accordance with the pressure sensor signal, wherein said electronic control unit includes multiplier means (95) for generating said electrical current from said pressure sensor signal connected between said electrical actuator (52) and said pressure sensor (90).

6. The continuously variable loop transmission as defined in claim 5, wherein said proportioning pressure relief valve (30) has a slide valve with a pressure working surface on a control oil pressure side and another pressure working surface on a secondary oil pressure side and the multiplier means (95) comprises a multiplier for calculating a set value of said hydraulic pressure in the secondary piston chamber, said multiplier is equal to a quotient of a dividend and a divisor, said dividend is equal to an area of said pressure working surface on the control oil pressure side and said divisor is equal to an area of said pressure working surface on the secondary oil pressure side.

7. An electro-hydraulic control means for controlling a hydraulic pressure of a hydraulic oil in a piston chamber in a piston-cylinder arrangement for clamping together two bevel disks of a bevel disk displacement device in a continuously variable loop transmission, wherein said electro-hydraulic control means includes pump means for supplying the piston chamber with the hydraulic oil in order to clamp said two bevel disks together;

a plurality of individual valves (30,50) including a proportioning pressure relief valve (30) and at least one flow control valve, wherein said at least one flow control valve (50) includes an electrical actuator (52) and means for triggering said proportioning pressure relief valve (30), and the proportioning pressure relief valve (30) and the at least one flow control valve (50) are connected with each other by a control pressure line (34);

a pressure sensor (90) connected in the control pressure line (34) and including means for generating a pressure sensor signal according to the hydraulic pressure in the control pressure line (34); and an electronic control unit for generating an electrical current for actuating said electrical actuator (52) and means for triggering according to the pressure sensor signal, wherein said electronic control unit includes multiplier means (95) for generating said electrical current from said pressure sensor signal and said multiplier means (95) is connected between said electrical actuator (52) and said pressure sensor (90).

8. The electro-hydraulic control means as defined in claim 7, wherein said proportioning pressure relief valve (30) has a slide valve with a pressure working surface on a control oil pressure side and another pressure working surface on a secondary oil pressure side and the multiplier means (95) comprises a multiplier for calculating a set value of said hydraulic pressure in the piston chamber, said multiplier is equal to a quotient of a dividend and a divisor, said dividend is equal to an area of said pressure working surface on the control oil pressure side and said divisor is equal to an area of said pressure working surface on the secondary oil pressure side.

* * * * *